(12) United States Patent
Schutten et al.

(10) Patent No.: US 7,672,147 B1
(45) Date of Patent: Mar. 2, 2010

(54) HIGH ATTENUATION FILTERING CIRCUIT FOR POWER CONVERTERS

(75) Inventors: Michael Joseph Schutten, Rotterdam, NY (US); Jeffrey Joseph Nasadoski, Gloversville, NY (US); John Stanley Glaser, Niskayuna, NY (US); Michael Andrew de Rooij, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 251 days.

(21) Appl. No.: 11/953,422

(22) Filed: Dec. 10, 2007

Related U.S. Application Data

(60) Provisional application No. 60/873,823, filed on Dec. 8, 2006.

(51) Int. Cl.
*H02M 1/12* (2006.01)
*H02M 1/14* (2006.01)

(52) U.S. Cl. .............................. 363/39; 363/40; 363/44; 363/45

(58) Field of Classification Search .................... 363/39, 363/40, 41, 44, 45, 46
See application file for complete search history.

(56) References Cited

U.S. PATENT DOCUMENTS

| | | | |
|---|---|---|---|
| 4,163,926 A | 8/1979 | Willis | |
| 4,190,791 A | 2/1980 | Hicks | |
| 4,298,892 A | 11/1981 | Scott | |
| 4,761,722 A | 8/1988 | Pruitt | |
| 5,602,464 A | 2/1997 | Linkowsky et al. | |
| 6,347,045 B1 * | 2/2002 | Poon et al. | 363/39 |
| 6,437,999 B1 * | 8/2002 | Wittenbreder | 363/39 |
| 6,693,805 B1 | 2/2004 | Steigerwald et al. | |
| 7,274,576 B1 * | 9/2007 | Zargari et al. | 363/39 |
| RE40,907 E * | 9/2009 | Steigerwald et al. | 363/39 |
| 2004/0022077 A1 * | 2/2004 | Steigerwald et al. | 363/39 |
| 2004/0240236 A1 * | 12/2004 | Lanni | 363/39 |
| 2005/0073863 A1 * | 4/2005 | de Rooij et al. | 363/39 |

* cited by examiner

*Primary Examiner*—Bao Q Vu
(74) *Attorney, Agent, or Firm*—Duane Morris LLP

(57) ABSTRACT

A power converter includes an output filter circuit including first and second inductive elements; a voltage source coupled to the output filter circuit, the voltage source for generating a voltage across the output filter circuit, the voltage including an alternating voltage component, the alternating voltage component causing the application of an alternating current to the first inductive element of the output filter circuit; and an attenuation filtering circuit. The attenuation filtering circuit includes a first magnetically coupled inductive arrangement for generating a first opposing alternating current in response to the alternating voltage applied to the first inductive element of the output filter circuit; a first combining element for combining the first opposing alternating current with the alternating current to partially cancel the alternating current, thereby producing an attenuated alternating current applied to the second inductive element of the output filter circuit; a second magnetically coupled inductive arrangement for generating a second opposing alternating current in response to the attenuated alternating current applied to the second inductive element of the output filter circuit; and a second combining element for combining the second opposing alternating current with the attenuated alternating current to substantially cancel the attenuated alternating current.

17 Claims, 7 Drawing Sheets

HIGH ATTENUATION FILTERING CIRCUIT FOR POWER CONVERTERS

RELATED APPLICATIONS

This application claims the benefit of U.S. Provisional Patent Application No. 60/873,823, filed on Dec. 8, 2006, the entire disclosure of which is incorporated herein by reference.

FIELD OF THE INVENTION

This invention relates to power supplies, and more particularly to low-noise or low-ripple power converters.

BACKGROUND OF THE INVENTION

Much of the advance in standard of living over the past twenty or so years results from the use of advanced communications, data processing, and environmental sensing techniques. The devices used in such communications, processing, and sensing generally become more useful as their sizes are decreased, such that more of them can be used. For example, computers and cellular phones require ever-smaller elements, and become more capable as the number of devices, which can be accommodated, increases. Similarly, light-weight and reliable sensors can be used in large numbers in vehicles to aid in control and, in the case of spacecraft and military vehicles, to aid in carrying out their missions.

Most modern semiconductor devices, and other devices important for the above purposes, are generally energized or biased by direct voltages. As devices have become smaller, their powering requirements also advantageously decrease. Unfortunately, a concomitant of low power requirements is often sensitivity to unintended noise or fluctuations in the applied power. It is easy to understand that extremely small transistors, which ordinarily operate at two or three volts, could be destroyed by application of tens of volts. It is less apparent but true that small-percentage variations or noise on the applied powering voltage may result in degradation of the operating characteristics of semiconductor and other devices and the circuits in which they operate, which may adversely affect the performance. It is a commonplace that conventional radio and television receivers will respond to noise on or sudden changes in their supply voltages with aural or visual distortions, or both.

In general, electronic equipments require direct voltages for their power sources. There are two general sources of electrical energy which can be used to provide the power, and these two sources are batteries, which provide direct voltage, and power mains of an alternating voltage. When power mains are the source of electrical energy, it is common to rectify the alternating voltage to achieve a direct voltage. The power mains are used to drive machine motors in addition to electronic equipment, so the mains voltages tend to be higher than the voltages required for electronic equipment, and rectified voltages also tend to be higher than desired or usable. In the past, transformers have been used to convert the mains power to voltages more compatible with electronic equipment. However, transformers operating at 60 Hz tend to be much larger than is desirable in modern miniaturized equipment. It might be thought that there are no problems with the powering of electronic equipment from batteries, which directly provide direct voltage. However, batteries have the same general problem as that of mains powering, namely that available direct voltage does not necessarily correspond with the desired operating voltage. One modern technique for producing voltages for powering electronic equipment is that of use of a switching power supply or switching converter, which changes a direct source voltage to a different direct voltage.

A switching power converter can operate from a direct voltage derived from the power mains or from a battery, and can either increase or decrease the output voltage relative to the input voltage. These switching power converters take many different forms, some examples of which include those described in U.S. Pat. No. 4,163,926 issued Aug. 7, 1979 in the name of Willis; U.S. Pat. No. 4,190,791, issued Feb. 26, 1980 in the name of Hicks; U.S. Pat. No. 4,298,892 issued Nov. 3, 1981 in the name of Scott; U.S. Pat. No. 4,761,722 issued Aug. 2, 1988 in the name of Pruitt; and U.S. Pat. No. 5,602,464 issued Feb. 11, 1997 in the name of Linkowski et al.

Radar, sensor, imaging, and other systems require power converters that produce very clean power. Ripple attenuation and cancelling circuits have been developed to achieve such ultra-low noise power converters. These prior art filter circuits, however, use many matched inductors and capacitors that must be cascaded together to achieve high attenuation filtering. Hence, undesirable parasitic components are difficult-to-impossible to cancel out in these circuits. Moreover, prior art filter circuits require many electrical components, and matching of components. All inductors in such prior art filter circuits must carry the full load current, and these filter circuits are extremely difficult to damp out to assure stable operation.

U.S. Pat. No. 6,693,805 discloses a ripple cancellation circuit that addresses many of the problems described above and achieves relatively high attenuation filtering. Unfortunately, the ripple cancellation circuit described in U.S. Pat. No. 6,693,805 is sensitive to magnetic component value matching and the attenuation thereof could be improved.

Accordingly, a power converter ripple attenuation or cancellation filtering circuit with very high ripple attenuation or cancellation filtering is needed, which avoids the problems associated with prior art ripple filtering circuits.

SUMMARY OF INVENTION

Disclosed herein is a power converter. The power converter comprises an output filter circuit including first and second inductive elements; a voltage source coupled to the output filter circuit, the voltage source for generating a voltage across the output filter circuit, the voltage including an alternating voltage component, the alternating voltage component causing the application of an alternating current to the first inductive element of the output filter circuit; and an attenuation filtering circuit.

The attenuation filtering circuit disclosed herein comprises a first magnetically coupled inductive arrangement for generating a first opposing alternating current in response to the alternating voltage applied to the first inductive element of the output filter circuit; a first combining element for combining the first opposing alternating current with the alternating current to partially cancel the alternating current, an intermediate capacitor, thereby producing an attenuated alternating current with a direct current component applied to the second inductive element of the output filter circuit; a second magnetically coupled inductive arrangement for generating a second opposing alternating current in response to the attenuated alternating current applied to the second inductive element of the output filter circuit; and a second combining element for combining the second opposing alternating current with the attenuated alternating current to substantially cancel the attenuated alternating current, leaving a large direct component of output voltage, with a small alternating component of voltage.

Also disclosed herein is a method for attenuation of an alternating current component of a power converter. The method comprises generating a first opposing alternating current in response to an alternating current applied to a first inductive element of an output filter circuit of the power converter circuit; combining the first opposing alternating current with the alternating current applied to the first inductive element to partially cancel the alternating current, an intermediate capacitor connected between the first and second stages, thereby producing an attenuated alternating current applied to a second inductive element of the output filter circuit of the power converter circuit; generating a second opposing alternating current in response to the attenuated alternating current applied to the second inductive element of the output filter circuit of the power conversion circuit; and combining the second opposing alternating current with the attenuated alternating current to substantially cancel the attenuated alternating current.

DETAILED DESCRIPTION OF THE INVENTION

Figure 1:
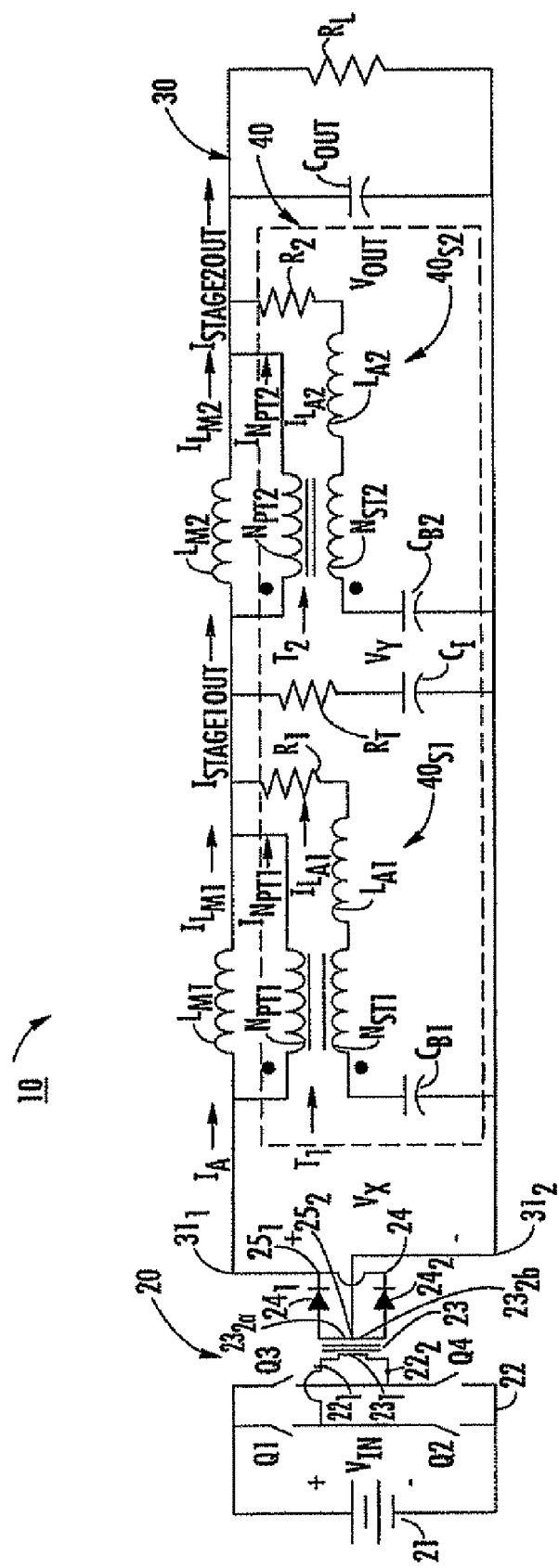
FIG. 1 is a simplified schematic diagram showing an exemplary embodiment of a power converter according to the present disclosure.

FIG. 1 is a simplified schematic diagram showing an exemplary embodiment of a power converter. The power converter, denoted generally by reference numeral 10, comprises a voltage source 20 and an output filter circuit 30 including an attenuation filtering circuit 40. The switching action of the power converter connected to the voltage source 20 produces a pulsating voltage $V_x(t)$, which is applied to the output filter circuit 30. The pulsating voltage $V_x(t)$ includes a DC voltage component with an AC voltage (ripple voltage) component superimposed thereon. The output filter circuit 30 includes a high attenuation filtering circuit 40 for removing the ripple voltage.

As shown in FIG. 1, the voltage source 20 comprises a voltage supply 21, a phase-shifted full-wave switched bridge circuit 22, a transformer 23, and a rectifying arrangement 24. The phase-shifted full-wave switched bridge circuit 22 includes first and second tap points $22_1$, $22_2$ across which an alternating voltage is generated. The transformer 23 includes a primary winding $23_1$ connected to the first and second tap points $22_1$, $22_2$. The transformer 23 also includes a secondary winding formed by first and second windings $23_{2a}$, $23_{2b}$ across which a varying voltage is generated in response to the alternating voltage. More specifically, the phase-shifted full-wave bridge circuit 22 includes a plurality of controllable switches Q1, Q2, Q3, and Q4. As known to those skilled in the art, the switches Q1, Q2, Q3, and Q4 can be operated in a number of modes and are operated by a controller (not illustrated) in a phase-shifted mode, in which the switches are rendered conductive in a manner that minimizes the voltages across the switches during at least one of turn-on and turn-off. The result of these operations produces the alternating voltage across the first and second tap points $22_1$, $22_2$ and therefore, across the primary winding $23_1$ of the transformer 23, which in turn, produces the varying voltage across the secondary windings $23_{2a}$, $23_{2b}$ of the transformer 23

The rectifying arrangement 24 includes first and second diodes or rectifiers $24_1$, $24_2$ having cathodes connected together at a third tap point $25_1$. Anodes of the rectifiers $24_1$, $24_2$ are connected to ends of the secondary windings $23_{2a}$ $23_{2b}$, which are remote from a fourth tap point $25_2$. The rectifying arrangement 24 converts the varying voltage across the first and second windings $23_{2a}$, $23_{2b}$ into the pulsating direct voltage $V_x(t)$ at the third and fourth tap points $25_1$ $25_2$.

In one exemplary embodiment, a 0 volt/100 volt 1 MHz pulsating direct voltage $V_x(t)$ can be generated at the third and fourth tap points $25_1$ $25_2$ with a 300 volt voltage supply 21 and a transformer 23 having a turns ratio of 3:1.

Figure 2A:
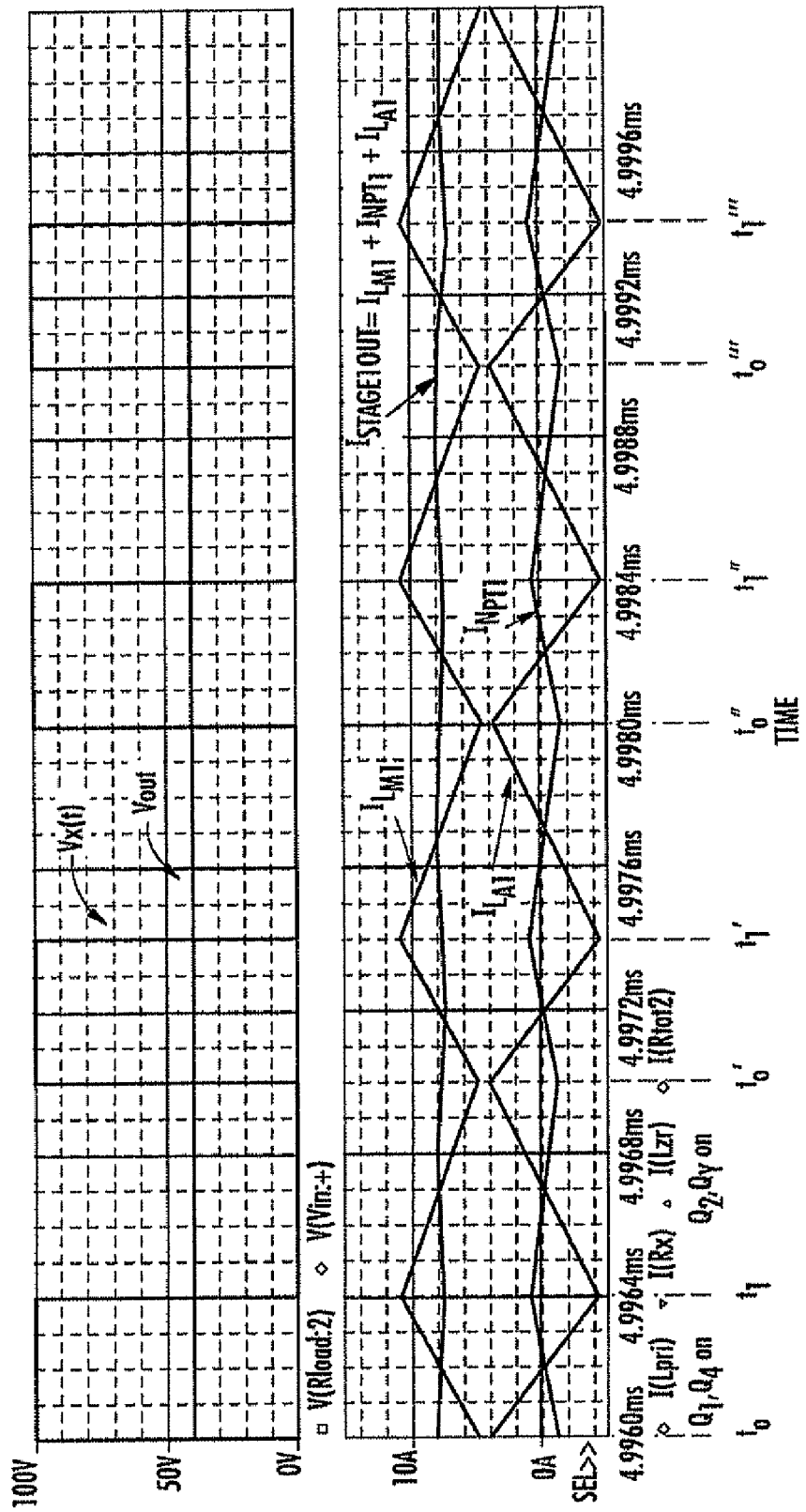
FIGS. 2A and 2B are amplitude-time plots of voltages and currents associated with the power converter of FIG. 1.
Figure 2B:
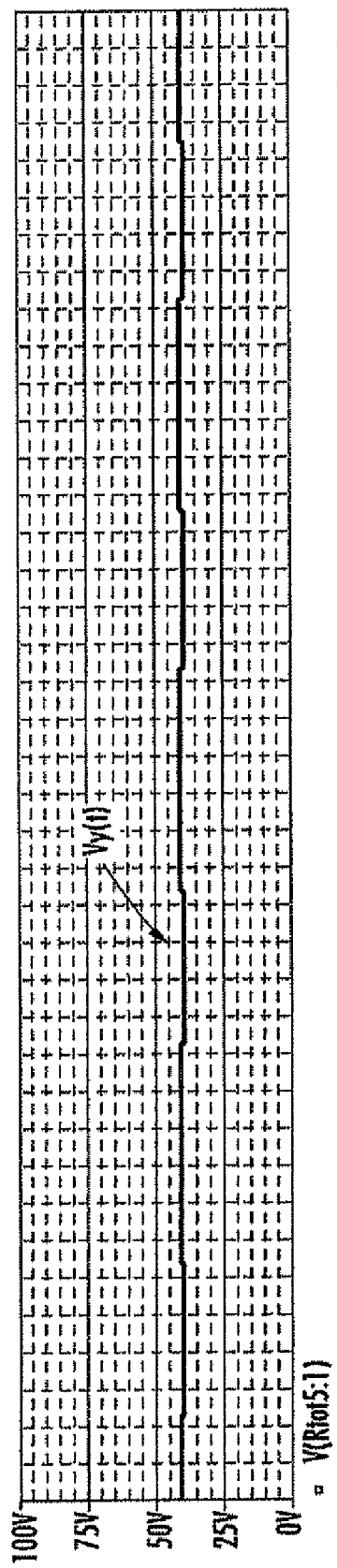
Figure 2B:
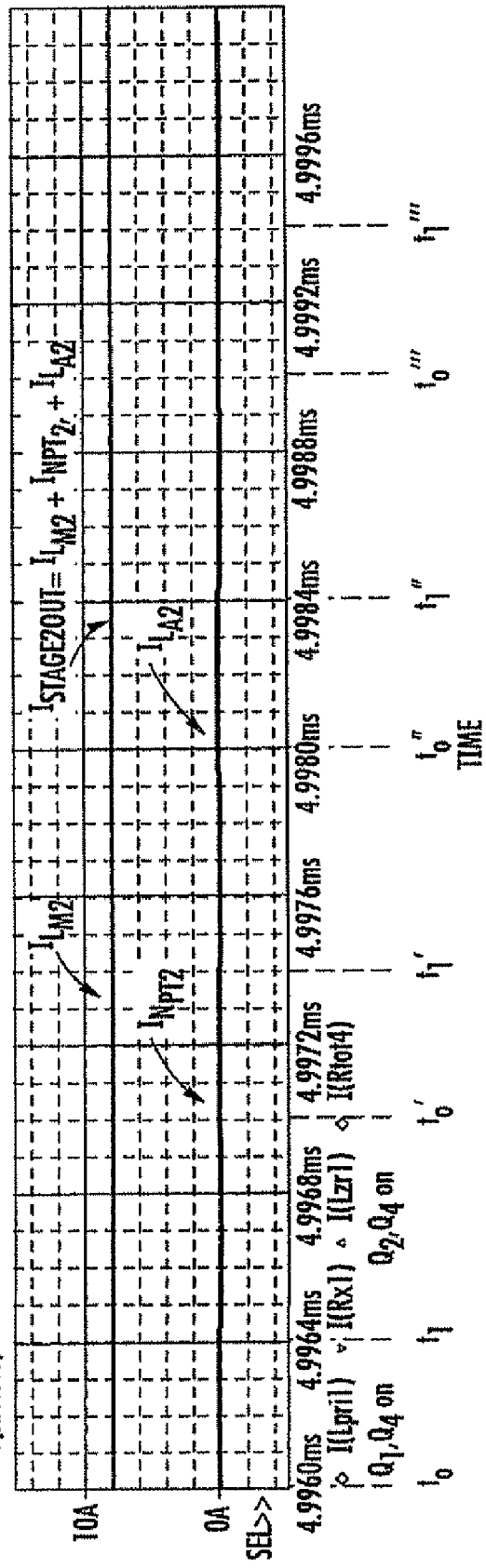
Figure 2C:
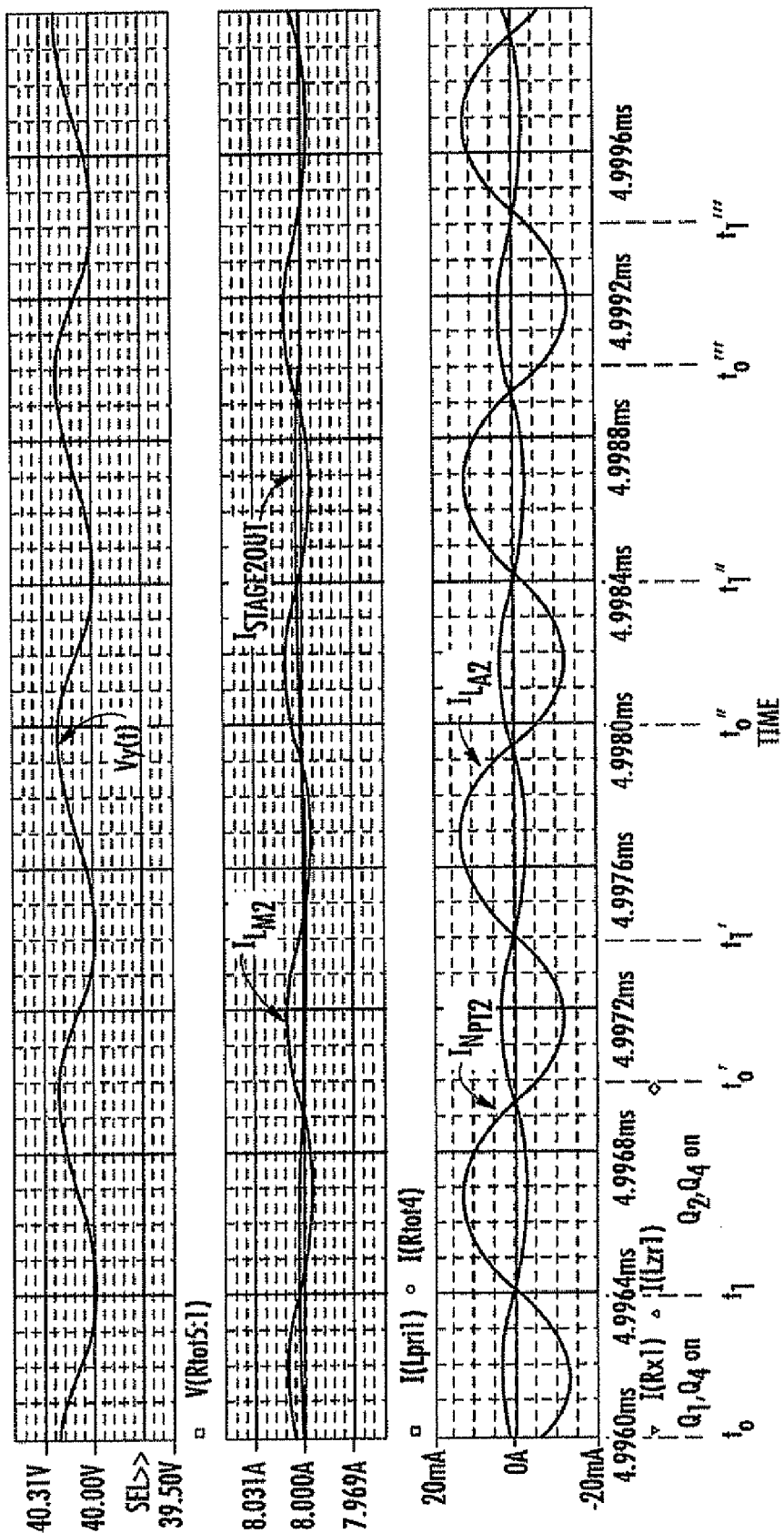
FIG. 2C are amplitude-time plots of voltages and currents of FIG. 2B shown on an expanded voltage and current scales.

The pulsating direct voltage $V_x(t)$ at the third and fourth tap points $25_1$ $25_2$ is applied across terminals $31_1$, and $31_2$ of the output filter circuit 30. FIGS. 2A, 2B, and 2C show plots representing the pulsating direct voltage $V_x(t)$ applied across terminals $31_1$, and $31_2$ of the output filter circuit 30 over time, at different time intervals to $t_0$ $t_1$, $t_0'$, to $t_1'$, $t_0''$ to $t_1''$, and $t_0'''$ to $t_1'''$, corresponding respectively to the on/off switching states of the switches Q1, Q2, Q3, and Q4 of the phase-shifted full-wave bridge circuit 22 of the voltage source 20.

Referring again to the exemplary embodiment of FIG. 1, the output filter circuit 30 comprises an LC output filter formed by an inductive arrangement connected in series with an output filter. The series connected inductive arrangement and an output filter are connected across terminals $31_1$, and $31_2$ for receiving the pulsating direct voltage $V_x(t)$. In the exemplary embodiment of FIG. 1, the inductive arrangement comprises a first main inductor $L_{M1}$ connected in series with a second main inductor $L_{M2}$ and the output filter comprises a capacitor $C_{OUT}$. In other embodiments, the inductive arrangement may comprise more than two main inductors and/or the output filter may comprise other types of filter structures.

The attenuation filtering circuit 40 includes first and second transformers $T_1$ and $T_2$, and an intermediate capacitor $C_1$. The first transformer $T_1$ includes a primary winding $N_{PT1}$ and a secondary winding $N_{ST1}$, poled as indicated in FIG. 1. The primary winding $N_{PT1}$ is connected across the first main inductor $L_{M1}$. The first main inductor $L_{M1}$ and the transformer $T_1$ may be constructed as a single coupled inductor element. A first blocking capacitor $C_{B1}$, a first auxiliary inductor $L_{A1}$, and a first resistor $R_1$, used for damping, are serially connected with the secondary winding $N_{ST1}$. The transformer $T_2$ includes a primary winding $N_{PT2}$ and a secondary winding $N_{ST2}$, poled as indicated in FIG. 1. The primary winding $N_{PT2}$ is connected across the second main inductor $L_{M2}$. A second blocking capacitor $C_{B2}$, a second auxiliary inductor $L_{A2}$, and a second resistor $R_2$, used for damping, are serially connected with the secondary winding $N_{ST2}$. The first main inductor $L_{M1}$, first transformer $T_1$, first blocking capacitor $C_{B1}$, first auxiliary inductor $L_{A1}$ and first resistor $R_1$ form a first filter stage $40_{S1}$, of the attenuation filtering circuit 40. The second main inductor $L_{M2}$, second transformer $T_2$, second blocking capacitor $C_{B2}$, second auxiliary inductor $L_{A2}$ and second resistor $R_2$ form a second filter stage $40_{S2}$ of the attenuation filtering circuit 40. The first and second filter stages $40_{S1}$, $40_{S2}$ of the attenuation filtering circuit 40 are connected by the series connected intermediate capacitor $C_1$ and a damping resistor $R_1$ arrangement, which form an intermediate filter stage.

As shown in FIGS. 2A, 2B, and 2C, each voltage pulse in the intervals to $t_0 t_1$, $t_0'$ to $t_1'$, $t_0''$ to $t_1''$, and $t_0'''$ to $t_1'''$, increases the electrical currents through the first and second main inductors $L_{M1}$ and $L_{M2}$, as illustrated by plots $IL_{M1}$ (FIG. 2A) and $IL_{M2}$ (FIG. 2B and FIG. 2C (shows voltage and currents on an expanded voltage and current scales)), respectively. In this context, $IL_{M1}$ represents the magnetizing or inductive current component flowing in the first main inductor $L_{M1}$, and $IL_{M2}$ represents the magnetizing or inductive current component flowing in the second main inductor $L_{M2}$. The increasing current flows through the first and second main inductors $L_{M1}$ and $L_{M2}$ in the intervals $t_0$ to $t_1$, $t_0'$ to $t_1'$, $t_0''$ to $t_1''$, and $t_0'''$ to $t_1'''$, flows as current $I_{STAGE\ 2\ OUT}$ through the output filter capacitor $C_{OUT}$. Since the output filter capacitor $C_{OUT}$ is relatively large, its AC voltage is small and most time varying currents flow therethrough. As known to those skilled in the art, the flow of increasing current generally results in an increasing output voltage $V_{OUT}$ across the output filter capacitor $C_{OUT}$, although the current drawn by the load, represented by resistor $R_L$ in FIG. 1, may under some conditions exceed the inductor current, thereby resulting in a net reduction of $V_{OUT}$. The voltage across output filter capacitor $C_{OUT}$ is the voltage available to supply the load represented by resistor $R_L$.

Referring collectively to FIG. 1 and FIGS. 2A and B, the pulsating direct voltage $V_x(t)$ applied across the series combination of the first and second main inductors $L_{M1}$ and $L_{M2}$ and output filter capacitor $C_{OUT}$ may be viewed as including a DC voltage component with an AC voltage component superposed thereon. The inductive arrangement and output filter capacitor $C_{OUT}$ may be viewed as a voltage divider, in which case the direct voltage component of pulsating direct voltage $V_x(t)$ may be viewed as being developed solely across the output filter capacitor $C_{OUT}$, as in steady-state operation, the inductive arrangement cannot develop or withstand a direct voltage. In this voltage divider view, the alternating component of the pulsating direct voltage $V_x(t)$ may be viewed as appearing across the inductance of inductive arrangement, assuming that output filter capacitor $C_{OUT}$ has zero impedance. However, filter capacitors have undesirable equivalent series resistance (ESR) and equivalent series inductance (ESL), so some portion of the applied alternating voltage component of pulsating direct voltage $V_x(t)$ will appear across output filter capacitor $C_{OUT}$. This alternating voltage component portion of the pulsatory direct voltage $V_x(t)$, i.e., ripple voltage undesirably manifests itself across the load $R_L$. Viewed another way, the alternating voltage component portion of the pulsatory direct voltage $V_x(t)$ applied to or across the inductive arrangement, results in an alternating current flow $I_A$ therein that flows mostly through the internal impedance of output filter capacitor $C_{OUT}$. This alternating current flow $I_A$ generates an undesired ripple voltage which appears across the load $R_L$.

In accordance with the principles of the disclosure, the alternating current flow $I_A$ resulting from the alternating voltage component of the pulsating direct voltage $V_x(t)$, developing an alternating voltage component across $L_{M1}$. This alternating component of voltage is applied across the winding $N_{PT1}$, and by transformer action, an alternating component of voltage appears across $N_{ST1}$, this in turn develops an alternating voltage across $L_{A1}$. The alternating voltage across $L_{A1}$ induces a current $IL_{A1}$, and by transformer action develops a current $IN_{PT1}$. The alternating current $IL_{A1}$ has a magnitude and phase (or polarity) which will cancel the alternating characteristic of the sum of the alternating currents $IL_{M1}$ and $IN_{PT1}$ respectively flowing through the first main inductor $L_{M1}$ and primary winding $N_{PT1}$. Accordingly, the first additional alternating current $IL_{A1}$ and the alternating currents $IL_{M1}$ and $IN_{PT1}$ combine together to form current $I_{STAGE1OUT}$ with a substantially reduced alternating characteristic.

The current $I_{STAGE1OUT}$ is filtered by the intermediate capacitor $C_1$ and its damping resistor $R_1$ of the intermediate filter stage, and an intermediate voltage $V_Y$ across the $C_1$-$R_1$ intermediate filter stage is the input voltage to the second filter stage. The voltage $V_Y$ across the $C_1$-$R_1$ intermediate filter stage is predominantly a direct voltage with a small alternating voltage component. The current for the second filter stage flows through the second main inductor $L_{M2}$, developing a small alternating component of voltage across $L_{M2}$. This alternating component of voltage is applied across the winding $N_{PT2}$, and by transformer action, an alternating component of voltage appears across $N_{ST2}$, this in turn develops an alternating voltage across $L_{A2}$. The alternating voltage across $L_{A2}$ induces a current $IL_{A2}$, and by transformer action develops a current $IN_{PT2}$. The alternating current $IL_{A2}$ has a magnitude and phase (or polarity) which will operate to substantially cancel any remaining alternating characteristic in the sum of the currents $IL_{M2}$ and $IN_{PT2}$ respectively flowing through the second main inductor $L_{M2}$ and primary winding $N_{PT2}$. Accordingly, the second additional current $IL_{A2}$ and the currents $IL_{M2}$ and $IN_{PT2}$ combine together to form current $I_{STAGE2OUT}$ with virtually no alternating characteristic.

In effect, the output filter capacitor $C_{OUT}$ "sees" only the direct current flow $I_{STAGE2OUT}$ because the alternating current components flowing in the main inductors $L_{M1}$ and $L_{M2}$, the primary windings $N_{PT1}$ and $N_{PT2}$, and the auxiliary inductors $L_{A1}$ and $L_{A2}$, add to nearly zero. Since almost no alternating current component flows through the internal impedance of output filter capacitor $C_{OUT}$, substantially no ripple voltage is generated across the output filter capacitor $C_{OUT}$.

The main inductors $L_{M1}$, $L_{M2}$ of the output filter circuit 30 carry a large DC load current, in addition to the small AC ripple current. The transformers $T_1$ and $T_2$ of the attenuation filtering circuit 40, however, are typically very small and carry virtually no DC current. In one exemplary embodiment, the transformers $T_1$ and $T_2$ and may each be formed by a single additional turn around their respective main inductor $L_{M1}$ and $L_{M2}$. In other exemplary embodiments, the transformers $T_1$ and $T_2$ and may each be formed by multiple turns around their respective main inductor $L_{M1}$ and $L_{M2}$. The capacitors $C_{B1}$, $C_{B2}$, and $C_1$ and resistors $R_1$, $R_2$, $R_I$ are small, low-power devices, and the auxiliary inductors $L_{A1}$ and $L_{A2}$ are very small, as they carry only a small AC current, and virtually no DC current, so the total added volume of the attenuation filtering circuit 40 may be much smaller than either one of the main inductors $L_{M1}$, $L_{M2}$ (which have to carry the large DC load current and the small AC ripple current) required for the output filter capacitor $C_{OUT}$ of the output filter circuit 30.

Proper matching of the auxiliary inductors $L_{A1}$, $L_{A2}$ to their respective main inductors $L_{M1}$, $L_{M2}$ depends upon the turns ratio of the coupled inductor assembly.

The coupled inductor turns ratio N for each of the transformers $T_1$, $T_2$ may be calculated by dividing the number of secondary windings by the number of primary windings. The desired value for each of the auxiliary inductors $L_{A1}$, $L_{A2}$ may be calculated by multiplying the inductance value of their respective main inductor $L_{M1}$, $L_{M2}$ by the coupled inductor turns ratio N, and then multiplying this value by 1 minus the coupled inductor turns ratio N.

In one exemplary embodiment where the attenuation filtering circuit provides a 1 MHz output, the ratio of the number of primary windings to the number of secondary windings for each of the transformers T1, T2 is 4:1, the coupled inductor turns ratio N is 0.25, the first main inductor $L_{M1}$ is 4 µH, the first blocking capacitor is 0.5 µF, the first resistor is 0.3 ohms, the intermediate capacitor is 0.5 µF, the intermediate resistor is 0.3 ohms, the second main inductor $L_{M2}$ is 2 µH, the second blocking capacitor is 0.1 µF, the second resistor is 0.1 ohms, the output filter capacitor $C_{OUT}$ is 200 µF and the load resistor $R_L$ is 5 ohms. Hence, the first auxiliary inductor $L_{A1}$ ideally should be 4×0.25×(1−0.25)=0.75 µH and the second auxiliary inductor $L_{A2}$ ideally should be 2×0.25×(1−0.25)=0.375 µH. The component values in other embodiments may be varied from those described above depending upon the desired output frequency and the like.

U.S. Pat. No. 6,693,805, which is incorporated herein by reference, describes an LC output filter including a prior art ripple cancellation circuit. The LC output filer/ripple cancellation circuit of the U.S. Pat. No. 6,693,805 forms a second order filter. The high attenuation filter circuit described herein increases the order of the LC output filter from a second-order filter, as described in U.S. Pat. No. 6,693,805, to an eighth order filter. In addition, high attenuation filter circuit is much less sensitive to matching of the main and auxiliary inductors than the single stage ripple cancellation circuit described in U.S. Pat. No. 6,693,805.

Figure 3:
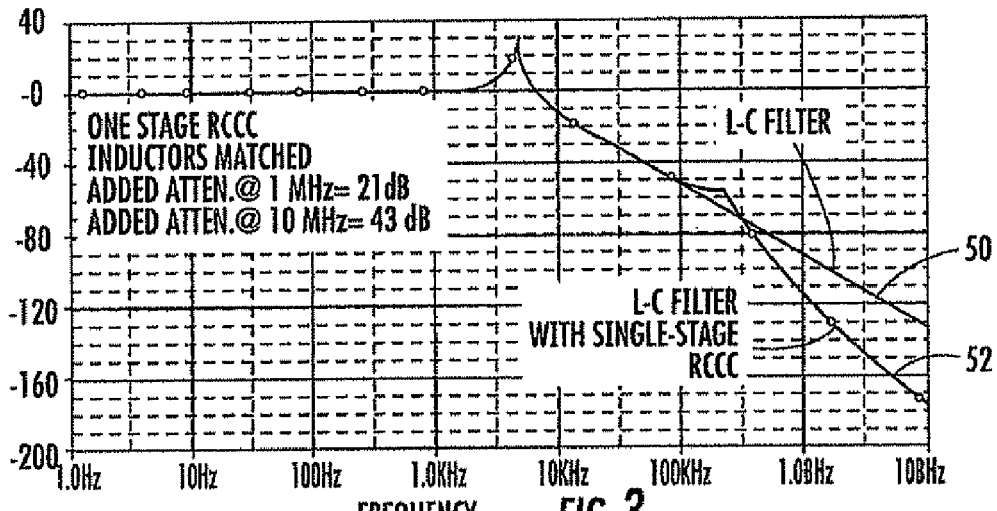
FIG. 3 shows two attenuation plots (attenuation versus frequency) for a prior art LC output filter circuit described in U.S. Pat. No. 6,693,805, where the auxiliary inductor of a single stage ripple cancellation circuit described therein is substantially matched to a main inductor of the LC output filter circuit.

FIG. 3 shows two attenuation plots 50 and 52 for the LC output filter circuit described in U.S. Pat. No. 6,693,805, where the auxiliary inductor of the single stage ripple cancellation circuit described therein is substantially matched to the main inductor of the LC output filter circuit, e.g., where the auxiliary inductor was set to 1.125 µH and the main inductor was set to 6 µH. Plot 50 shows the attenuation of the LC output filter circuit when the single stage ripple cancellation circuit was not included and plot 52 shows the attenuation of the LC output filter when the ripple cancellation circuit was included therewith. As can be seen, the attenuation added by this prior art ripple cancellation circuit at 1 MHz was 21 dB and at 10 MHz was 43 dB.

Figure 4:
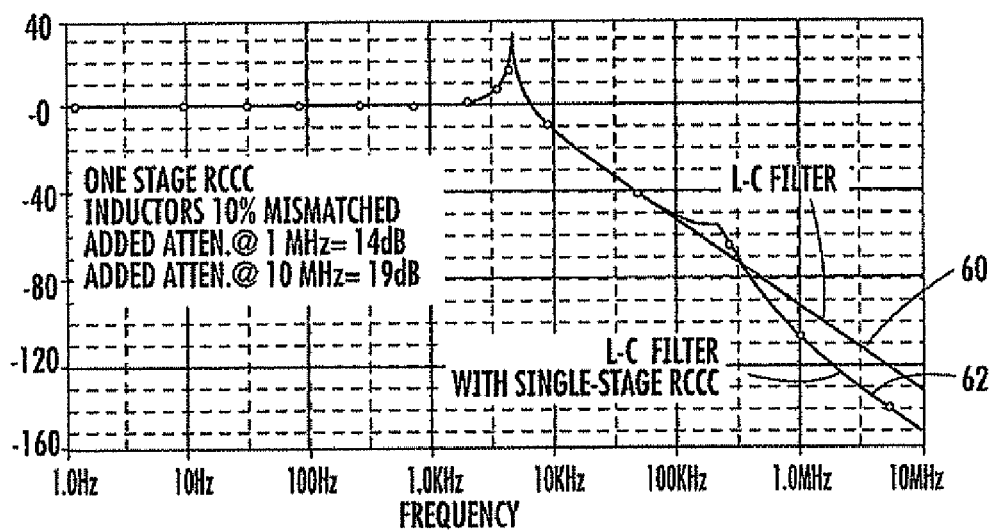
FIG. 4 shows two attenuation plots (attenuation versus frequency) for the LC output filter circuit described in U.S. Pat. No. 6,693,805, where the auxiliary inductor of the single stage ripple cancellation circuit is mismatched to the main inductor of the LC output filter circuit by 10%.

FIG. 4 shows two attenuation plots 60 and 62 for the LC output filter circuit described in U.S. Pat. No. 6,693,805, where the auxiliary inductor of the single stage ripple cancellation circuit described therein is mismatched to the main inductor of the LC output filter circuit by 10%, e.g., where the auxiliary inductor was set to 1.0125 µH and the main inductor was set to 6 µH. Plot 60 shows the attenuation of the LC output filter circuit when the single stage ripple cancellation circuit was not included and plot 62 shows the attenuation of the LC output filter circuit when the ripple cancellation circuit was included therewith. As can be seen, the attenuation added by the prior art ripple cancellation circuit of U.S. Pat. No. 6,693,805 was limited to 14 dB at 1 MHz, which is about a 7 db reduction in attenuation when compared to matched inductors. The attenuation added by the prior art ripple cancellation circuit of U.S. Pat. No. 6,693,805 was limited to only to 19 dB at 10 MHz, which is about a 24 dB loss in attenuation, when compared to the matched inductors embodiment. This indicates a practical limitation on how much added attenuation can be obtained from the prior art single stage ripple cancellation circuit of U.S. Pat. No. 6,693,805.

Figure 5:
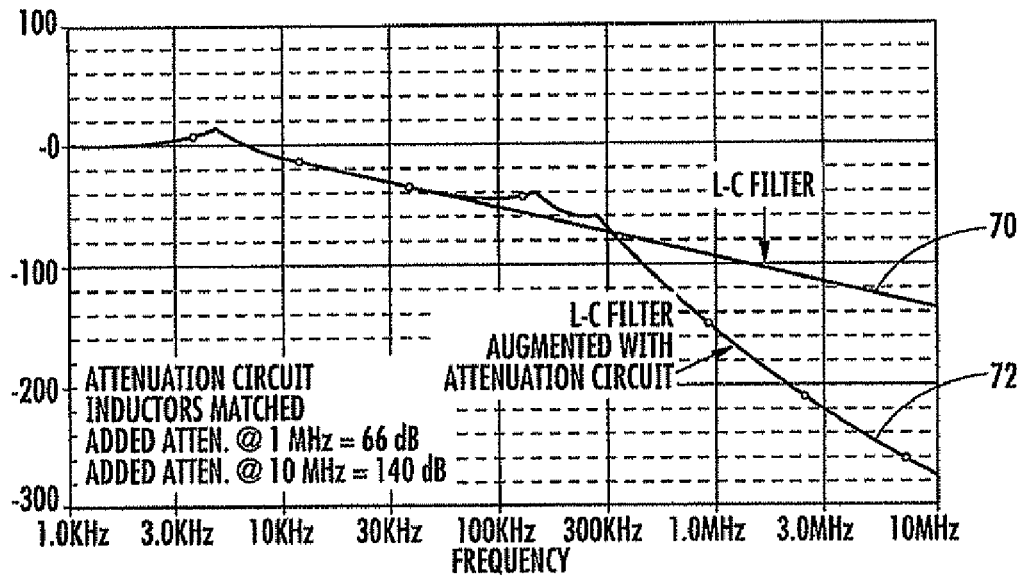
FIG. 5 shows two attenuation plots (attenuation versus frequency) for an LC output filter circuit disclosed herein, where auxiliary inductors of a two stage attenuation filtering circuit of the LC output circuit are substantially matched to their corresponding main inductors of the LC output filter circuit.

FIG. 5 shows two attenuation plots 70 and 72 for the LC output filter circuit 30 disclosed herein, where the auxiliary inductors $L_{A1}$, $L_{A2}$ of the two stage attenuation filtering circuit 40 disclosed herein are substantially matched to their corresponding main inductors $L_{M1}$, $L_{M2}$ of the LC output filter circuit 30, e.g., where the auxiliary inductors $L_{A1}$ and $L_{A2}$ were set to 0.75 µH and 0.375 µH respectively, and their corresponding main inductors $L_{M1}$ and $L_{M2}$ were set to 4 µH and 2 µH, respectively. Plot 70 shows the attenuation of the LC output filter 30 circuit when the two stage attenuation filtering circuit 40 (ripple cancellation circuit) was not included and plot 72 shows the attenuation of the LC output filter circuit 30 when the attenuation filtering circuit 40 was included therewith. As can be seen, the attenuation added by the attenuation filtering circuit 40 circuit at 1 MHz was 66 dB and at 10 MHz was 140 dB.

Comparing the attenuation filtering circuit 40 disclosed herein to the prior art ripple cancellation circuit of U.S. Pat. No. 6,693,805, the attenuation filtering circuit 40 added about 45 dB more attenuation to the LC output filter 30 at 1 MHz than the attenuation added by the ripple cancellation circuit of U.S. Pat. No. 6,693,805, with matched the auxiliary and main inductors. At 10 MHz, the attenuation filtering circuit 40 added almost 100 dB more attenuation to the LC output filter 30 than the attenuation added by the ripple cancellation circuit of U.S. Pat. No. 6,693,805, with matched auxiliary and main inductors.

Figure 6:
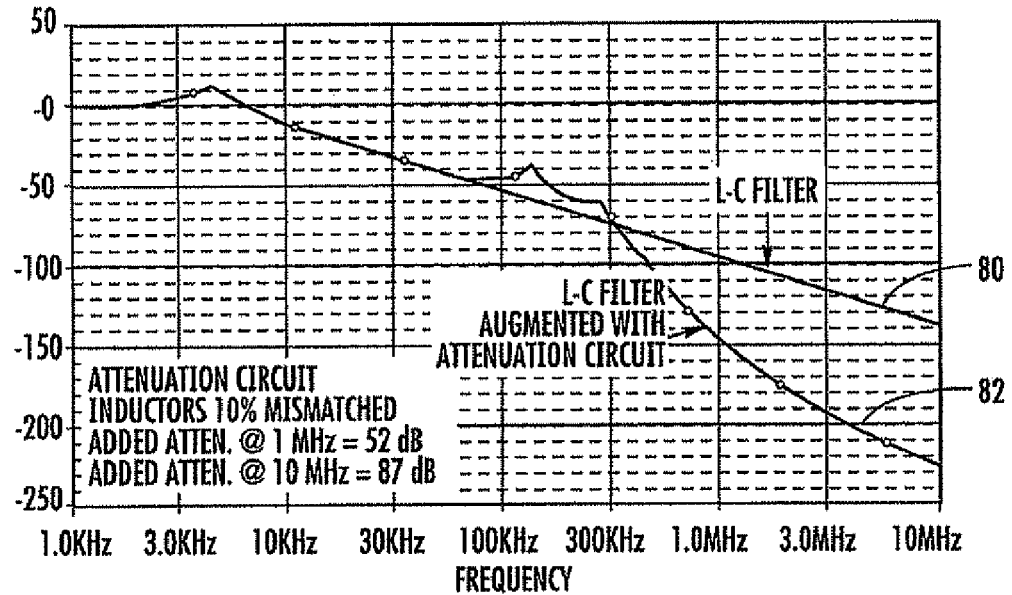
FIG. 6 shows two attenuation plots (attenuation versus frequency) for the LC output filter circuit, where auxiliary inductors of the two stage attenuation filtering circuit of the LC output circuit are mismatched to their corresponding main inductors of the LC output filter circuit by 10%.

FIG. 6 shows two attenuation plots 80 and 82 for the LC output filter circuit 30 disclosed herein, where the auxiliary inductors $L_{A1}$, $L_{A2}$ of the two stage attenuation filtering circuit 40 disclosed herein are mismatched to their corresponding main inductors $L_{M1}$, $L_{M2}$ of the LC output filter circuit 30 by 10%, e.g., where the auxiliary inductors $L_{A1}$ and $L_{A2}$ were set to 0.675 µH and 0.3375 µH respectively, and their corresponding main inductors $L_{M1}$ and $L_{M2}$ were set to 4 µH and 2 µH, respectively. Plot 80 shows the attenuation of the LC output filter 30 circuit when the two stage attenuation filtering circuit 40 was not included and plot 82 shows the attenuation of the LC output filter circuit 30 when the attenuation filtering circuit 40 was included therewith. As can be seen, the attenuation added by the attenuation filtering circuit 40 circuit at 1 MHz was still 52 dB and at 10 MHz was still 87 dB with mismatched auxiliary inductors.

Comparing again the attenuation filtering circuit 40 disclosed herein to the prior art ripple cancellation circuit of U.S. Pat. No. 6,693,805 with a perfectly matched auxiliary inductor, the attenuation filtering circuit 40 still added about 31 dB more attenuation to the LC output filter 30 at 1 MHz with mismatched auxiliary and main inductors than the attenuation added by the ripple cancellation circuit of U.S. Pat. No. 6,693, 805, added about 44 dB more attenuation to the LC output filter 30 at 10 MHz with mismatched auxiliary and main inductors than the attenuation added by the ripple cancellation circuit of U.S. Pat. No. 6,693,805, with matched the auxiliary and main inductors. Thus, even with mismatched auxiliary inductors, the proposed two stage approach still provides very high attenuation.

Figure 7:
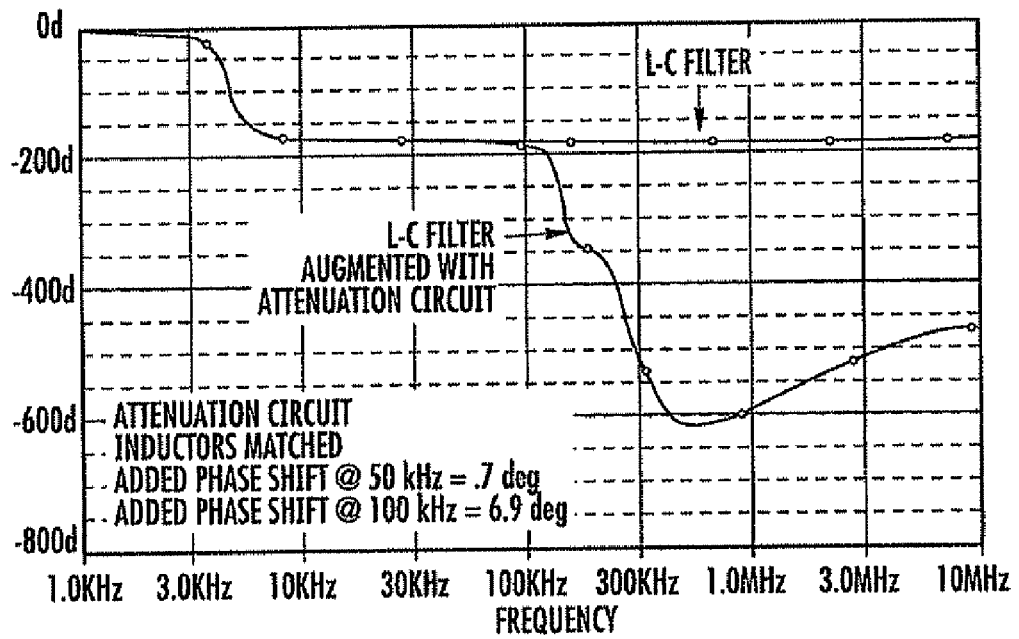
FIG. 7 shows a phase shift plot (phase shift versus frequency) for the LC output filter circuit disclosed herein, where auxiliary inductors of a two stage attenuation filtering circuit of the LC output circuit are substantially matched to their corresponding main inductors of the LC output filter circuit.
Figure 8:
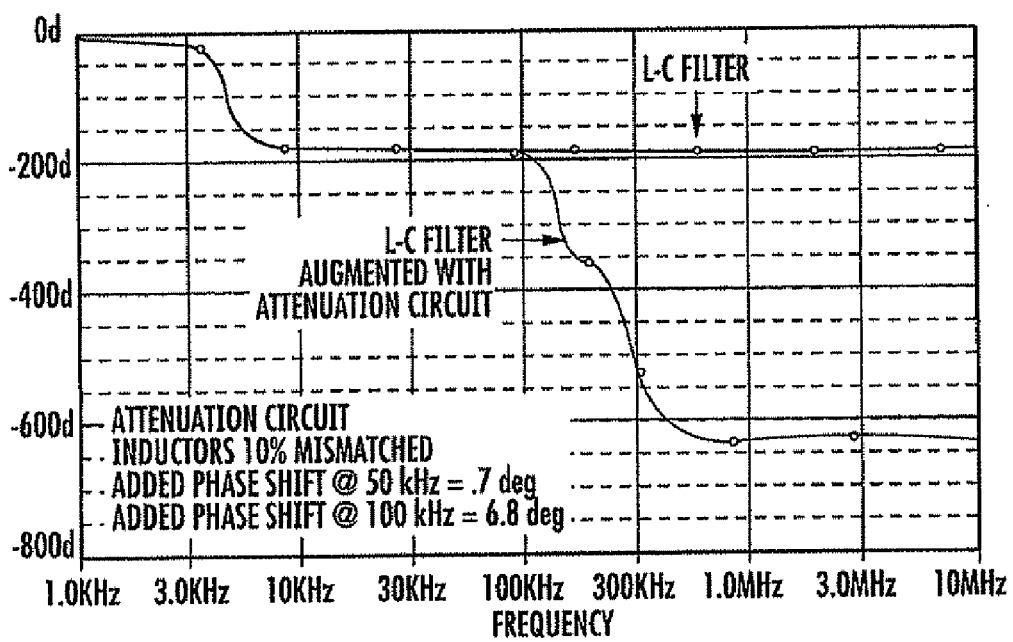
FIG. 8 shows a phase shift plot phase shift versus frequency) for the LC output filter circuit, where auxiliary inductors of the two stage attenuation filtering circuit of the output circuit are mismatched to their corresponding main inductors of the LC output filter circuit by 10%.

As shown in FIGS. 7 and 8, there is very little additional phase shift associated with the attenuation filtering circuit 40, e.g., 0.7 degrees at 50 kHz with matched and 10% mismatched auxiliary and main inductors, 6.9 degrees at 100 kHz with matched auxiliary and main inductors, and 6.8 degrees at 100 kHz with 10% mismatched auxiliary and main inductors, until a breakpoint is hit. After the breakpoint, a very large phase shift occurs. The attenuation filtering circuit 40 can be used inside a power converter feedback circuit to provide high attenuation, while not affecting the converter closed-loop performance, because there is very little phase shift up to the converter power bandwidth, which would be less than 100 kHz. This allows the attenuation filter circuit 40 to be inside the feedback loop, that is, the output capacitor, Cout, voltage can still be used as the sensed voltage for the converter feedback, with very little added phase shift due to the high attenuation filter circuit.

The attenuation filtering circuit 40 is much smaller than other ripple cancellation circuits, because only some of the components carry the full load current, and is very easy to damp the using low-power components.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A power converter comprising:
   an output filter circuit including first and second inductive elements;
   a voltage source coupled to the output filter circuit, the voltage source for generating a voltage across the output filter circuit, the voltage including an alternating voltage component, the alternating voltage component causing the application of an alternating current to the first inductive element of the output filter circuit; and
   an attenuation filtering circuit comprising:
      a first magnetically coupled inductive arrangement for generating a first opposing alternating current in response to the alternating voltage applied to the first inductive element of the output filter circuit;
      a first combining element for combining the first opposing alternating current with the alternating current to partially cancel the alternating current, thereby producing an attenuated alternating current applied to the second inductive element of the output filter circuit, the first magnetically coupled inductive arrangement and the first combining element forming a first filter stage;
      a second magnetically coupled inductive arrangement for generating a second opposing alternating current in response to the attenuated alternating current applied to the second inductive element of the output filter circuit;
      a second combining element for combining the second opposing alternating current with the attenuated alternating current to substantially cancel the attenuated alternating current, the second magnetically coupled inductive arrangement and the second combining element forming a second filter stage; and
      an intermediate capacitor between the first and second filter stages.

2. The power converter according to claim 1, wherein the output filter circuit further includes an output filter.

3. The power converter according to claim 2, wherein the output filter comprises a capacitor.

4. The power converter according to claim 1, wherein the first magnetically coupled inductive arrangement comprises a third inductive element magnetically coupled to the first inductive element of the output filter circuit and generating the first opposing alternating current.

5. The power converter according to claim 4, wherein the second magnetically coupled inductive arrangement comprises a fourth inductive element magnetically coupled to the second inductive element of the output filter circuit and generating the second opposing alternating current.

6. The power converter according to claim 1, wherein the second magnetically coupled inductive arrangement comprises a third inductive element magnetically coupled to the second inductive element of the output filter circuit and generating the second opposing alternating current.

7. The power converter according to claim 1, wherein the first magnetically coupled inductive arrangement comprises a first transformer and a third inductive element magnetically coupled by the first transformer to the first inductive element of the output filter circuit, the third inductive element generating the first opposing alternating current.

8. The power converter according to claim 7, wherein the second magnetically coupled inductive arrangement comprises a second transformer and a fourth inductive element magnetically coupled by the second transformer to the second inductive element of the output filter circuit, the fourth inductive element generating the second opposing alternating current.

9. The power converter according to claim 1, wherein the second magnetically coupled inductive arrangement comprises a transformer and a third inductive element coupled by the transformer to the second inductive element of the output filter circuit, the third inductive element generating the second opposing alternating current.

10. An attenuation filtering circuit for a power converter, the attenuation filtering circuit comprising:
    a first magnetically coupled inductive arrangement for generating a first opposing alternating current in response to an alternating current applied to a first inductive element of an output filter circuit of the power converter;
    a first combining element for combining the first opposing alternating current with the alternating current applied to the first inductive element to partially cancel the alternating current, thereby producing an attenuated alternating current applied to a second inductive element of the output filter circuit of the power converter circuit, the first magnetically coupled inductive arrangement and the first combining element forming a first filter stage;
    a second magnetically coupled inductive arrangement for generating a second opposing alternating current in response to the attenuated alternating current applied to the second inductive element of the output filter circuit of the power conversion circuit;

a second combining element for combining the second opposing alternating current with the attenuated alternating current to substantially cancel the attenuated alternating current, the second magnetically coupled inductive arrangement and the second combining element forming a second filter stage; and an intermediate capacitor between the first and second stage.

11. The attenuation filtering circuit according to claim 10, wherein the first magnetically coupled inductive arrangement comprises a third inductive element for magnetically coupling to the first inductive element of the output filter circuit and generating the first opposing alternating current.

12. The attenuation filtering circuit according to claim 11, wherein the second magnetically coupled inductive arrangement comprises a fourth inductive element for magnetically coupling to the second inductive element of the output filter circuit and generating the second opposing alternating current.

13. The attenuation filtering circuit according to claim 10, wherein the second magnetically coupled inductive arrangement comprises a third inductive element for magnetically coupling to the second inductive element of the output filter circuit and generating the second opposing alternating current.

14. The attenuation filtering circuit according to claim 10, wherein the first magnetically coupled inductive arrangement comprises a first transformer and a third inductive element, the first transformer for magnetically coupling the third inductive element to the first inductive element of the output filter circuit, the third inductive element generating the first opposing alternating current.

15. The attenuation filtering circuit according to claim 14, wherein the second magnetically coupled inductive arrangement comprises a second transformer and a fourth inductive element, the second transformer for magnetically coupling the fourth inductive element to the second inductive element of the output filter circuit, the fourth inductive element generating the second opposing alternating current.

16. The attenuation filtering circuit according to claim 1, wherein the second magnetically coupled inductive arrangement comprises a transformer and a third inductive element coupled by the transformer to the second inductive element of the output filter circuit, the third inductive element generating the second opposing alternating current.

17. A method for attenuation an alternating current component of a power converter, the method comprising the steps of:

generating a first opposing alternating current in response to an alternating current applied to a first inductive element of an output filter circuit of the power converter circuit;

combining the first opposing alternating current with the alternating current applied to the first inductive element to partially cancel the alternating current, thereby producing an attenuated alternating current applied to a second inductive element of the output filter circuit of the power converter circuit;

generating a second opposing alternating current in response to the attenuated alternating current applied to the second inductive element of the output filter circuit of the power conversion circuit; and combining the second opposing alternating current with the attenuated alternating current to substantially cancel the attenuated alternating current.

\* \* \* \* \*